United States Patent [19]
Tamai et al.

[11] Patent Number: 5,122,700
[45] Date of Patent: Jun. 16, 1992

[54] FRICTIONAL MATERIAL FOR VIBRATION WAVE DRIVEN MOTOR

[75] Inventors: Jun Tamai; Shoichi Shimura, both of Yokohama; Yasuyuki Nakai, Tokyo, all of Japan

[73] Assignee: Canon Kabushiki Kaisha, Tokyo, Japan

[21] Appl. No.: 586,303

[22] Filed: Sep. 21, 1990

[30] Foreign Application Priority Data

Sep. 28, 1989 [JP] Japan .................. 1-252996

[51] Int. Cl.⁵ .............................. H01L 41/08
[52] U.S. Cl. ...................................... 310/323
[58] Field of Search .................. 310/323, 328

[56] References Cited

U.S. PATENT DOCUMENTS

| Re. 33,390 | 10/1990 | Sashida | 310/323 |
|---|---|---|---|
| 4,587,452 | 5/1986 | Okumura et al. | 310/328 |
| 4,779,018 | 10/1988 | Okuno et al. | 310/323 |
| 4,914,338 | 4/1990 | Murakami | 310/323 |
| 4,926,085 | 5/1990 | Sawayama et al. | 310/323 |
| 4,965,482 | 10/1990 | Ohnishi et al. | 310/323 |
| 4,975,614 | 12/1990 | Honda | 310/323 |

FOREIGN PATENT DOCUMENTS

| 62-100178 | 5/1987 | Japan . |  |
|---|---|---|---|
| 63-3661 | 1/1988 | Japan . |  |
| 1-29783 | 5/1989 | Japan | 310/323 |

Primary Examiner—Mark O. Budd
Attorney, Agent, or Firm—Fitzpatrick, Cella, Harper, & Scinto

[57] ABSTRACT

A vibration wave driven motor in which a vibration member and a member brought into pressure contact with the vibration member are frictionally driven relative to each other through a frictional material secured to the driving portion of one of them, characterized in that the frictional material is composed of a cermet.

9 Claims, 7 Drawing Sheets

FIG. 7

| No | BASIC MATERIAL (wt%) | | | | | | HARD PARTICLE (wt%) | | | FIBER (wt%) | | LUBRICATION COMPONENT (wt%) | | MOLDING TYPE |
|---|---|---|---|---|---|---|---|---|---|---|---|---|---|---|
| | Cu | Sn | Fe | Al | Ni | Cr | Al₂O₃ | SiC | Si | C | Al₂O₃ | GRAPHITE | LUBRICATION OIL | |
| 1 | 95 | | | | | | | | | | | 5 | | POWDER SINTERING |
| 2 | 84.5 | 4.5 | | | | | | | | | | 11 | | |
| 3 | 80 | 5 | | | | | | | | | | 10 | | |
| 4 | | | | BAL | | | 5 | 5 | | | | | 5 | |
| 5 | | | BAL | | | | | | | 5 | | | 5 | |
| 6 | | | BAL | | 16 | 7 | 5 | 5 | | | | | 5 | |
| 7 | 10 | | | BAL | | | | | | | 5 | 5 | | |
| 8 | 4 | | | | BAL | | | | 20 | | | | | CASTING |
| 9 | | | | | | | | 20 | | | | | | FRAME SPRAYING |
| 10 | BAL | | | | | | | 10 | | | | | | DEPOSITION |

FIG.8

| No | TORQUE | WEARNESS | NOISE | STABILITY | TOTAL EVALUATION |
|----|--------|----------|-------|-----------|------------------|
| 1 | × | NOT EVALUABLE | ○ | ○ | × |
| 2 | × | NOT EVALUABLE | ○ | ○ | × |
| 3 | ◎ | ◎ | ◎ | ◎ | ◎ |
| 4 | × | ◎ | ◎ | ◎ | ○ |
| 5 | ◎ | ◎ | ◎ | ◎ | ◎ |
| 6 | ◎ | ◎ | ○ | ◎ | ◎ |
| 7 | △ | ○ | ○ | ○ | △ |
| 8 | × | NOT EVALUABLE | ○ | × | × |
| 9 | ◎ | ○ | ○ | △ | ○ |
| 10 | ◎ | ○ | ○ | △ | ○ |

5,122,700

FRICTIONAL MATERIAL FOR VIBRATION WAVE DRIVEN MOTOR

BACKGROUND OF THE INVENTION

1. Field of the Invention

The present invention relates to a vibration wave driven motor, and, more particularly, to a frictional material used so as to form a friction surface of the vibration wave driven motor.

2. Related Background Art

Hitherto, there has been disclosed a frictional material of a friction member of a vibration wave driven motor in, for example, Japanese Patent Laid-Open No. 62-100178. According to this disclosure, a WC-Co film is used as the frictional material on the oscillator side of the vibration wave driven motor, while a hard alumite is used as the frictional material on the moving side of the same so that the durability of the motor is improved.

However, both the above-described conventional frictional materials WC-Co and hard alumite are brittle materials, having, poor damping performance. Therefore, they may be easily worn and encounter problems in terms of noise. It is known that the WC-Co material has a large friction coefficient expressed by $\mu$ because of a reason to be described later It is also known that hard alumite has a large friction coefficient expressed by $\mu$. Therefore, there has been a technology in which molybdenum disulfide is impregnated into openings formed in the alumite film in order to reduce the friction coefficient expressed by $\mu$ so as to use it as the moving portion of a bearing or the like which must have a satisfactory sliding performance. As described above, it has been necessary to select a suitable material so as to meet the specification of the vibration wave driven motor from the conventional frictional materials although they respectively have a too large friction coefficient. For example, the vibration wave driven motor employing a material formed by combining the WC-Co film and the hard alumite as the frictional material thereof has been employed in a lens moving mechanism for realizing the automatic focusing function of a camera. In this case, the life of the vibration wave driven motor for a camera of this type is allowed to be shorter than that of electromagnetic motors. Furthermore, the quantity of wear in the material manufactured by combining the above-described frictional materials is able to satisfactorily meet the specification in the case of the vibration wave driven motor for a camera. As for noise, it can be considerably prevented by reducing the surface roughness so as to maintain a uniform contact state. Since the above-described frictional material is a porous material, the driving force can be extremely deteriorated if a small quantity of oil adheres to its surface. However, since the above-described vibration wave driven motor for the camera lens is arranged in such a manner that the overall body of the motor is substantially hermetically sealed, no problem arises. However, the oscillator motor of this type encounters a problem in terms of the performance when it is employed in another technical field. That is, a frictional material exhibiting excellent driving force transmission, wear resistance and noise eliminating performance has been desired.

SUMMARY OF THE INVENTION

An object of the present invention is to provide a frictional material for a vibration wave driven motor capable of generating large torque.

Another object of the present invention is to provide a frictional material also capable of stably transmitting driving force.

A further object of the present invention is to provide a frictional material for a vibration wave driven motor exhibiting excellent wear resistance.

A still further object of the present invention is to provide a frictional material also capable of eliminating noise.

Other and further objects, features and advantages of the invention will be more fully apparent from the following description.

According to the present invention, the above-described objects are achieved by using cermet as the frictional material.

BRIEF DESCRIPTION OF THE DRAWINGS

FIG. 7 illustrates the composition of a friction member 12; and

FIG. 8 illustrates experimental results.

DESCRIPTION OF THE PREFERRED EMBODIMENTS

Figure 1:
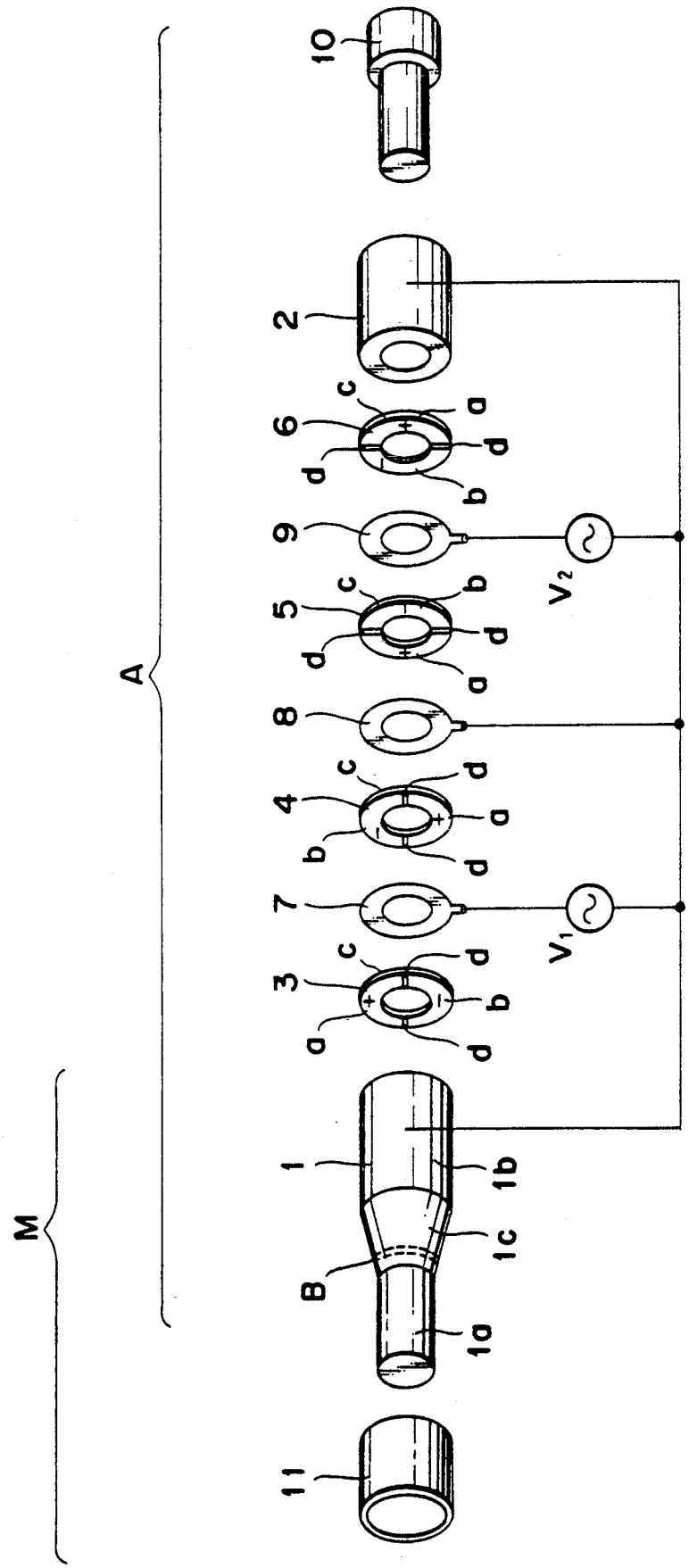
FIG. 1 is an exploded perspective view which illustrates a vibration wave driven motor according to the present invention.

FIG. 1 is an exploded perspective view which illustrates an embodiment of a vibration wave driven motor using a frictional material according to the present invention.

Reference numeral 1 represents a vibration member having a horn portion 1c, in the form of a horn, which is disposed between a small-diameter portion 1a the diameter of which is 10 mm (to be expressed as "$\phi$10" hereinafter), at the front portion thereof, and a large-diameter portion 1b, the diameter of which is $\phi$18 at the rear end portion. The vibration member 1 is made of a round metal rod. Reference numeral 2 represents a retainer, the outer diameter of which is the same as that of the large-diameter portion 1b. The retainer 2 is made of a round metal rod having a hole into which a bolt is inserted at the axial center thereof. Reference numerals 3, 4, 5 and 6 respectively represent annular piezoelectric plates, the outer diameter of each of which is the same as that of the large-diameter portion 1b. Reference numerals 7, 8 and 9 respectively represent electrode plates. Thus, an oscillator A is constituted by disposing the piezoelectric plates 3 to 6 so as to hold the electrode plates 7, 8 and 9 between the vibration member 1 and the retainer 2, and by securing the retainer 2 to the vibration member 1 by using a bolt 10 so as to secure the piezoelectric plates 3 to 6 serving as electromechanical conversion devices between the vibration member 1 and the retainer 2. As a result, the overall length of the oscillator A becomes 72 mm. The vibration member 1, the electrode plate 8 and the retainer 2 are electrically connected to one another.

Each of the piezoelectric plates 3 to 6 has, on either side thereof, two electrodes (a positive electrode "a" and a negative electrode "b" symmetrically disposed on the two sides of an insulating portion "d" formed on the central axis thereof. The two electrodes a and b are polarized in the different directions from each other. The two electrodes a and b are polarized in the direction of the thickness of each of the piezoelectric plates 3 to 6. Furthermore, each of the piezoelectric plates 3 to 6 has a common electrode "c" for the above-described two electrodes, the positive electrode a and the negative electrode b. The piezoelectric plates 3 and 4 and the piezoelectric plates 5 and 6 are disposed so as to be angularly shifted from one another by 90°. The divided electrodes, the positive electrode a and the negative electrode b of the piezoelectric plate 3 are positioned in contact with the rear end surface of the vibration member 1 serving as an electroconductive member. Furthermore, the piezoelectric plate 6 is positioned in contact with the front surface of the retainer 2 also serving as an electroconductive member.

When AC voltage $V_1$ is applied between the electrode plate 7 and the vibration member 1 and AC voltage $V_2$, the electrical phase of which is different from AC voltage $V_1$, is applied between the electrode plate 9 and the vibration member 1, vibrations due to the expansion/contraction displacement of each of the piezoelectric plates 3 and 4 in the direction of their thickness and vibrations due to the expansion/contraction displacement of each of the piezoelectric plates 5 and 6 are synthesized so that the oscillator A is vibrated. That is, the vibrations of the different phases are generated in two different planes of the oscillator A so that the oscillator A is vibrated.

According to this embodiment, four piezoelectric devices are employed so as to lower the voltage applied thereto. Another structure may, of course, be employed in which only the piezoelectric devices 3 and 5 and the electrode plate 8 are employed. In this case, an insulating washer (omitted from illustration) must be provided in order to insulating the vibration member 1 from the retainer 2. Reference numeral 11 represents a rotor fitted to the small-diameter portion 1a. A motor M is constituted by the rotor 11 and the oscillator A. Although the rotor 11 is arranged as a spool for winding a film for a camera according to this embodiment, the rotor 11 can be arranged as the platen roller for a printer or a paper feeding roller for a copying machine.

Figure 2:
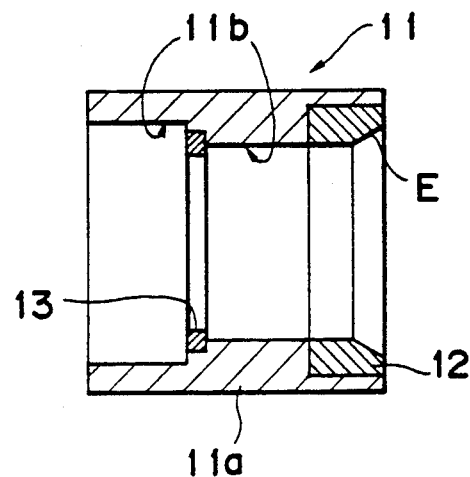
FIG. 2 is a cross sectional view which illustrates a rotor therefor.

FIG. 2 is a cross sectional view which illustrates the rotor 11. Reference numeral 11a represents a cylindrical rotor housing and 12 represents a friction member disposed on the inner surface at the rear end of the rotor housing 11a. A horn-like opening E of the friction member 12 is positioned in contact with a driving portion B (also expressed as a "moving portion B") of the horn portion 1c of the vibration member 1.

Figure 3:
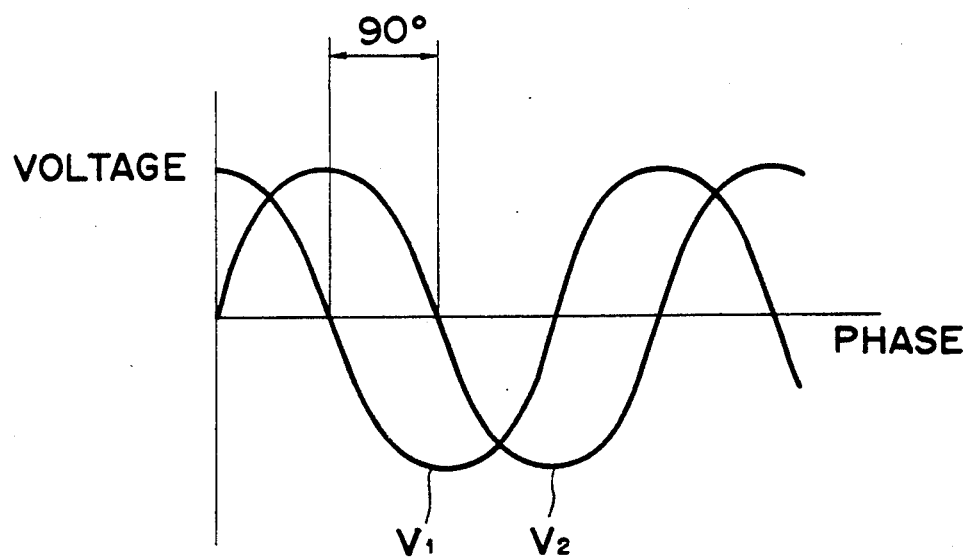
FIG. 3 illustrates the waveform of an AC power source for a plate having piezoelectric devices serving as an electromechanical energy conversion device.

As shown in FIG. 3, the AC voltages $V_1$ and $V_2$ are arranged to have the same amplitude and frequency, but the frequency is different by 90° in terms of time and spatial phase.

As a result, the oscillator A performs a circular motion relative to its axis. Since the principle of generation of the above-described circular motion is a known fact, the description of it is omitted here.

Figure 4A:
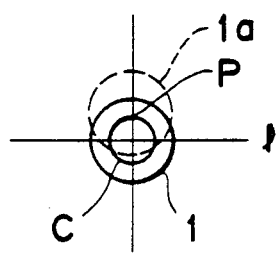
FIGS. 4A and 4B are front and side views which illustrate a rope skipping rotational motion having three nodes.
Figure 4B:
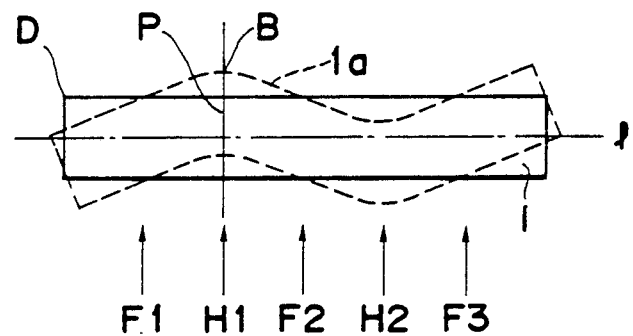

According to this embodiment, the oscillator A vibrates in a mode consisting of three nodes in such a manner that the two ends and, the moving portion B of the oscillator A are arranged to be the loop of the above-described vibration mode. As shown in FIGS. 4A and 4B, the vibration member 1 performs a rope skipping rotary motion in which axis I is arranged to be the center, and central point P of loop H1 of the rotary motion moves, as shown in FIG. 4B, on the circumference of circle C. The rotor 11 is rotated relative to the axis 1 by utilizing the rope skipping rotary motion of the moving portion B. As a result, torque obtained in the moving portion B becomes smaller than the torque obtained in front portion D.

Figure 5:
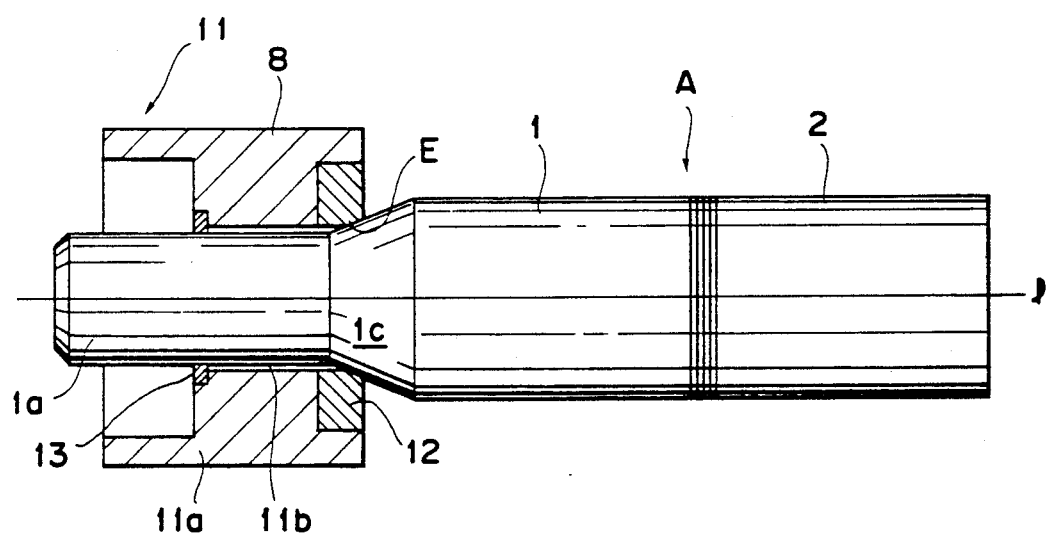
FIG. 5 illustrates a state in which the motor is assembled.

As shown in FIG. 5, the rotor 11 is coaxially fitted to the axis 1 of the oscillator A in such a manner that the friction member 12 disposed on the inner surface of the rotor 11 extends to the position which corresponds to the position of the moving portion B, and the horn-like opening E of the friction member 12 is positioned in contact with the moving portion B of the horn portion 1c. The horn portion 1c is provided for the purpose of obtaining proper frictional force from the moving portion B due to the receipt of axial pressure. The moving portion B serves as the loop of the rope skipping motion performed by the vibration member 1.

The rotor 11 is arranged so as to be, via a member having a low friction coefficient, positioned at a position of the node of the rope skipping rotary motion performed by the vibration member 1. In order to prevent noise due to contact with the portions other than the moving portion B, a relief portion 11b is provided for the rotor 11.

The friction member 12 included in the rotor 11 opens in a horn shape which fits the outer contour of the moving portion B so that it comes in plane-contact with the moving portion B at the time of the rope skipping rotary motion performed by the vibration member 1.

The rotor 11 is positioned in contact with the moving portion B having the above-described tapered shape by a spring or the like (omitted from illustration) via a thrust bearing (omitted from illustration). Therefore, a predetermined frictional force is generated between the rotor 11 and the above-described moving portion B. Furthermore, the thrust bearing allows the axial rotation of the rotor 11.

Figure 6A:
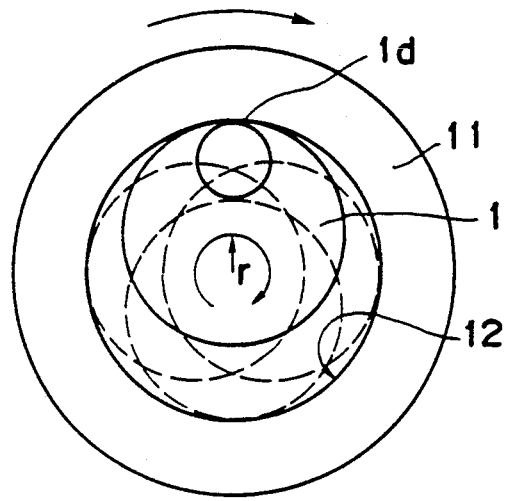
FIGS. 6A and 6B illustrate the principle of the driving operation.

That is, assuming that the oscillator A vibrates in, for example, a three-node vibration mode in which the moving portion B is arranged to be the loop of this vibration mode, the vibration member 1 performs, as shown in FIG. 4, a rope skipping rotary motion relative to the axis 1. As a result, as shown in FIG. 6A, the moving portion B performs a clockwise or counterclockwise circular action the trajectory of which is a predetermined radius r relative to the axis 1, causing the rotor to be rotated, the moving portion B performing the circular motion with frictional contact with the friction member 12. FIG. 6A illustrates a structure in which the outer diameter of the moving portion B is made considerably smaller than the inner diameter of the friction member 12 of the rotor 11 for the purpose of describing the fact that the moving portion B performs the circular motion when brought into contact with the friction member 12 of the rotor 11. Since the actual radius of the rope skipping rotary motion of the moving portion B is an extremely small radius, the moving portion B and the inner surface of the friction member 12 are disposed away from each other by a small distance.

That is, an optional point 1*d* of the moving portion B of the vibration member 1 performs a circular motion and comes in contact with the inner surface of the rotor during the rotary motion so that frictional driving force for causing the rotor 11 to be rotated is given to the same.

Figure 6B:
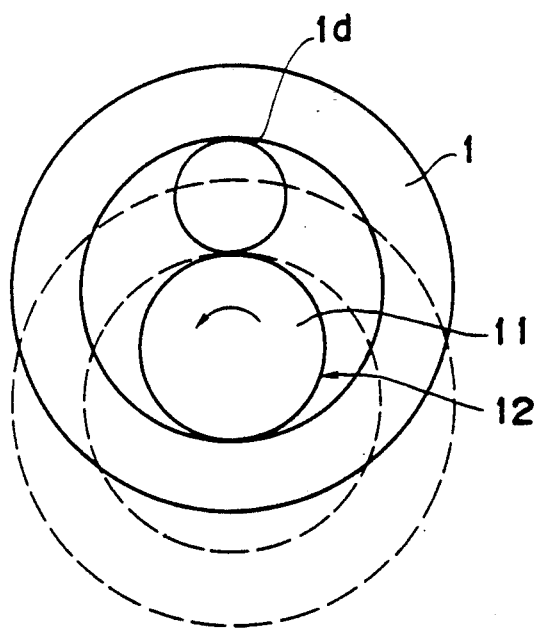

FIG. 6B illustrates a case, contrary to the case shown in FIG. 6A, in which the vibration member 1 is in the form of a cylinder and the rotor 11 rotates with contact with the inner surface of the hollow portion of the cylindrical vibration member 1. In this case, the direction of the vibrating rotation of the vibration member 1 and that of the rotor become different from each other.

FIG. 7 shows the composition of each of a variety of the friction members 12 (No. 1 to 10) subjected to experiments. FIG. 8 illustrates the results of the experiments. The vibration member 1 subjected to the experiments was prepared by refining martensite stainless steel JIS SUS 420J2 hardened and tempered so as to have hardness of $H_RC52$. The vibration member 1 was not applied with a surface treatment such as plating, but was lapped so as to have the maximum surface roughness of 2 μm or less. The input voltage was 60 Vp-p, the thrusting force applied to the vibration member 1 of the rotor 11 was 500 g.f, and the resonant frequency for the three-node vibration mode was 25.3 kHz.

The expression "BAL" in FIG. 7 is the abbreviation of term "balance".

The factors shown in FIG. 7 were evaluated in accordance with the following criterion:

| | |
|---|---|
| Evaluation of Torque | |
| Maximum Torque | |
| 300 g · f-cm or more | ⊚ |
| 200 g · f-cm or more and less than 300 g · f-cm | ○ |
| 100 g · f-cm or more and less than 200 g · f-cm | Δ |
| less than 100 g · f-cm | x |
| Evaluation of Wearness. at the time of the rated (load 150 g · f-cm) rotation | |
| no wear dust confirmed in 2 hours or longer | ⊚ |
| no wear dust confirmed in 30 minutes | ○ |
| no wear dust confirmed in 1 minute | Δ |
| wear dust confirmed within 1 minute | x |
| Evaluation of Noise | |
| No noise at rated rotation | ⊚ |
| No noise at no-load rotation | ○ |
| noise confirmed at no-load rotation | x |
| Evaluation of Stability | |
| Reduction in speed of rotation was less than 10% and non-uniform rotation was less than 1% in two hours of rated rotation | ⊚ |
| Reduction in speed of rotation was less than 10% and non-uniform rotation was less than 3% in two hours of rated rotation | ○ |
| Reduction in speed of rotation was less than 20% and non-uniform rotation was less than 3% in two hours of rated rotation | Δ |
| Reduction in speed of rotation was 20% or more in two hours of rated rotation | x |
| Total Evaluation | |
| The evaluation marked ⊚ was given 5 points, ○ was given 3 points, Δ was given 1 point and x or "not evaluable" was given no point. | |
| 16 or more points | ⊚ |
| 12 points or more and less than 16 points | ○ |
| 8 points or more and less than 12 points | Δ |
| less than 8 points | x |

As a result, it was found that it was preferable that a cermet frictional material be used which contained hard particles ($Al_2O_3$ or SiC), that is, a heat resisting compound in the metal base material (see Table 1) thereof. A lubricating component (see Table 1) significantly contributed to prevent wear and inorganic fiber had an effect of preventing wear in the case where the base material was a soft material although depending upon the accuracy of the frictional contact surface. As for noise, it was found that noise generation could be prevented in usual in the case where the base material was made of a soft material (for example, Cu). As for the stability, for example, the non-uniform rotation was satisfactorily prevented by a lubricating component (see Table 1).

The friction member according to the present invention can also be applied to a vibration wave driven motor, for example, a motor of a type disclosed in U.S. Pat. No. 4,587,452 which is arranged in such a manner that the rotor thereof is driven due to an elliptical motion performed by a frictional contact portion with the rotor of the vibration member in consideration of the principle of the generation of torque in the friction member, status of the wear and the mechanism of generation of noise.

As described above, large motor torque, which cannot be obtained from sole metal alone, can be obtained by using a cermet material which contains a heat resistant component in the base material thereof. Furthermore, a motor exhibiting satisfactory wear resistance and stability can be manufactured by adding the lubricating material by a proper quantity. In addition, generation of noise can be prevented by using the soft material such as copper or aluminum as metal forming the cermet material.

Although the friction member 12 is disposed on the rotor side according to the above-described embodiment, it may be provided for the vibration member 1 and the rotor side may be made of martensite stainless steel (SUS 420J2), causing the similar effect to be obtained.

Although the invention has been described in its preferred form with a certain degree of particularly, it is understood that the present disclosure of the preferred form may be changed in the details of construction and the combination and arrangement of parts may be resorted to without departing from the spirit and the scope of the invention as hereinafter claimed.

We claim:

1. A vibration wave driven motor in which a vibration member and a member brought into pressure contact with said vibration member are frictionally driven relative to each other through a frictional material secured to a driving portion of one of them, characterized in that said frictional material is composed of a cermet which includes a lubricating component.

2. A vibration wave driven motor according to claim 1, wherein one or more element is selected as a metal material serving as an aggregate of said cermet material from a group consisting of copper, aluminum, iron, tin, nickel, chrome.

3. A vibration wave driven motor according to claim 1, wherein one or more element is selected as a heat resisting compound forming said cermet from a group consisting of alumina, silicon carbide and silicon.

4. A vibration motor in which a vibration member and a member brought into pressure contact with said vibration member are frictionally driven relative to each other through a frictional material secured to a driving portion of one of them, characterized in that said frictional material is composed of a cermet which includes a lubricating component.

5. A vibration motor according to claim 4, wherein one or more element is selected as a metal material serving as an aggregate of said cermet material from a group consisting of copper, aluminum, iron, tin, nickel, chrome.

6. A vibration motor according to claim 4, wherein one or more element is selected as a heat resisting compound forming said cermet from a group consisting of alumina, silicon carbide and silicon.

7. A vibration wave driven device for a printer comprising:
 (a) a vibration member having a friction surface and for generating a periodic vibration in response to an applied electrical signal;
 (b) a friction member for receiving the periodic vibration, said friction member being in contact with a friction surface of said vibration member; and
 (c) a frictional material provided on one of said friction surface and said friction member, said frictional material being composed a cermet which includes a lubricating component.

8. A vibration wave driven device for a system comprising:
 (a) a vibration member having a friction surface and for generating a periodic vibration in response to an applied electrical signal;
 (b) a friction member for receiving the periodic vibration, said friction member being in contact with the friction surface of said vibration member; and
 (c) a frictional material provided on one of said friction surface and said friction member, said sliding material being composed of a cermet which includes a lubricating component.

9. A vibration motor comprising:
 (a) a vibration member having a driving portion and for generation of a vibration in response to an applied electrical signal, thereby to cause relative movement between said vibration member and a contact member in contact with the driving portion; and
 (b) a frictional material provided on the driving portion, said frictional material being composed of a cermet which includes a lubricating component.

* * * * *

UNITED STATES PATENT AND TRADEMARK OFFICE
CERTIFICATE OF CORRECTION

PATENT NO. : 5,122,700  Page 1 of 2
DATED : June 16, 1992
INVENTOR(S) : Jun Tamai et al.

It is certified that error appears in the above-identified patent and that said Letters Patent is hereby corrected as shown below:   On the title page: Item

[56] References Cited
FOREIGN PATENT DOCUMENTS

Line 3, change "1-29783 5/1989 Japan" to --1-129783 5/1989 Japan--.

[56] References Cited
Attorney, Agent or Firm

Line 1, change "Fitzpatrick, Cella, Harper, & Scinto" to --Fitzpatrick, Cella, Harper & Scinto--.

COLUMN 1

Line 24, change "having," to --having--.
    Line 27, change "$\mu$ because" to --$\mu$ (because--.
    Line 28, change "later It" to --later). It--.

COLUMN 2

Line 26, change "cross sectional" to --cross-sectional--.
    Line 50, change "1a the" to --1a, the--.

COLUMN 3

Line  9, change "electrode "b"" to --electrode "b")--.
    Line 12, delete "the".
    Line 47, change "insulating" to --insulate--.
    Line 55, change "cross sectional" to --cross-sectional--.

UNITED STATES PATENT AND TRADEMARK OFFICE
CERTIFICATE OF CORRECTION

PATENT NO. : 5,122,700
DATED : June 16, 1992
INVENTOR(S) : Jun Tamai et al.

It is certified that error appears in the above-identified patent and that said Letters Patent is hereby corrected as shown below:

COLUMN 4

Line 5, change "and," to --and--.
    Line 9, change "axis I" to --axis 1--.

COLUMN 6

Line 24, delete "sole".
    Line 40, change "particularly," to --particularity,--.
    Line 59, change ""nickel, chrome." to --nickel and chrome.--.

COLUMN 7

Line 6, change "nickel," to --nickel and--.
    Line 22, change "composed" to --composed of--.

COLUMN 8

Line 10, change "sliding" to --frictional--.

Signed and Sealed this

Twenty-sixth Day of October, 1993

Attest:

BRUCE LEHMAN

*Attesting Officer*       *Commissioner of Patents and Trademarks*